Feb. 16, 1971 A. C. SCHOUW 3,563,004
SEPARATOR STRUCTURE

Filed Oct. 29, 1968  2 Sheets-Sheet 1

INVENTOR
ARTHUR C. SCHOUW
BY
Miller, Morris, Pappas & McLeod
ATTORNEYS

Feb. 16, 1971 A. C. SCHOUW 3,563,004
SEPARATOR STRUCTURE
Filed Oct. 29, 1968 2 Sheets-Sheet 2

INVENTOR
ARTHUR C. SCHOUW
BY
ATTORNEYS

United States Patent Office 3,563,004
Patented Feb. 16, 1971

3,563,004
SEPARATOR STRUCTURE
Arthur C. Schouw, Corunna, Mich., assignor to Anpol Research Corporation, Owosso, Mich., a corporation of Michigan
Filed Oct. 29, 1968, Ser. No. 771,490
Int. Cl. B03c *3/38*
U.S. Cl. 55—103                                    3 Claims

ABSTRACT OF THE DISCLOSURE

The device of the present invention is a compact separator structure for removing contaminants from contaminant laden gases or vapors and combines an orifice entry, a fan chamber and a cylindrical foraminous filtration column or zone surrounding the fan chamber and through which gases and/or liquids or mixtures thereof are spirally entrained to exhaust in a velocity reduction chamber defined by the fan chamber and the outer case and through an exhaust port. The entry and exhaust openings are in axial alignment and the axis of the fan or blower is coaxial therewith and the foraminous cylindrical filtration chamber is concentrically disposed in respect to the axis of the structure and the entire device is encased as between the entry and exhaust openings with a gravity sump provided at the base of the filtration column. Flow directors assist the spiralling flow of gases, vapors, liquids and/or mixtures thereof and a gathering hood may be attached to guide contaminants and/or gases, vapors, liquids and mixtures thereof to the entry of the structure. Spray nozzles may be interposed to provide additive vapors to gases, liquids and/or mixtures thereof prior to entry.

---

The present invention may be broadly classified as a separator structure and under certain conditions of use might be designated as a scrubber wherein the liquids, gases, vapors and/or mixtures thereof, require separation as for example from air so as to decontaminate the air and in certain situations to recover useable fractions of the materials in the air. Characteristically, for example, oil-air mixtures exist in certain shop environments and it is desirable to separate the oil from the air and return the decontaminated air to the shop or to vent and to return the reclaimed oil to use. In other environments, for example in the plating industry, a variety of chemical particles or radicals are suffused in the air. Some of these are toxic and harmful and their removal from the air is necessary and desirable before the air is reused or vented. The present structure is directed to a filtration, separator, scrubber construction treating a wide range of industrial pollutant situations.

The construction is primarily unique for its compactness while yielding a result comparable or better than many devices substantially larger and more expensive. The device provides a spiral entrainment of contaminant laden gases through an open filter bed and providing the moving particles with a much longer exposure to filtration media than seen in any known filter structures. In addition, the device exploits a selective electrostatic precipitation and accomplishes a violent pressure drop over a relatively short distance thereby insuring maximum efficiency in minimum space.

Accordingly, the invention has as its principal object a new and useful compact construction for separators.

Another object is to provide a structure in which particle exposure to a filtration bed is sustained by a spiral entrainment thereby increasing the chance or frequency of impingement.

Another object is to accomplish the above objects while incorporating selective electrostatic precipitation and scrubbing where desired.

Still another object is to provide a highly adjustable structure independent of the fan or blower characteristic for adjustment of input and output velocities.

Still another object is to provide a cylindrical filter column coaxial about the axis of the fan, blower or impeller shaft and coaxial with the entry and exit openings whereby maximum utilization of space is exploited.

Still another object is to provide a resin casing, a resin blade and resin tube filters the latter having openings therethrough and the resins of all parts being differentially selected to accomplish efficient electrostatic separation in accord with the electrostatic character of particles of gases, vapor, liquids and/or mixtures thereof including entrained solids passing to the separator.

Other objects including simplicity of installation, economical construction, service, accessability, and cost reduction without loss of efficiencies will be apparent to those skilled in the art as the description proceeds.

While searching has failed to reveal structure in accord with the present invention the following known devices generally treat the area of use intended for the present invention: U.S. Pats. 950,607 and 1,218,354 to Baldwin, 1,749,260 to Prétot, 1,966,280 to Bingman, 2,158,966 to Hemming, 2,186,125 to Roberts and 3,006,436 to Starbuck. This work together with applicant's own prior applications represents his prior knowledge of related devices in the patent art.

GENERAL DESCRIPTION

In general the separator structure of the present invention is a device for removing contaminants from contaminant laden gases or vapors and is cylindrical or columinar in character. An outer tubular shell or casing is provided. In concentric relation within the shell is a ring of foraminous filter media. Also concentric within the shell and coaxial with the ring is a bell housing containing a fan or blower impeller element, the drive shaft of which is on the axis of the casing. The housing is spaced adjacent a transverse wall or barrier across one end of the tubular shell and through which an opening is provided coaxial with the fan. The opening feeds to the eye of the impeller or fan and the mixture of gases containing contaminants is thereupon delivered by the fan or impeller through an annular orifice defined between the barrier and the bell housing. The spacing is accomplished by flow directors which support the bell housing and complement or assist the spiralling entrainment of the air as it centrifugally leaves the impeller and bell housing and impinges spirally and swirlingly to and through the foraminous filter column. The entry pressure radically drops and the spiralling air, gases and/or entrained particles and vapors are subjected to a sustained exposure through the filter media. They ultimately exhaust through a port provided in the end of the casing opposite the fan or entry. The drive means for the fan may be conveniently secured to the bell housing and on the axis of the casing, or belting or other means may apply the necessary rotational driving force to the fan from an external source of power or a motor. It is contemplated that at entry, velocities may be adjusted by sizing of the entry opening and exit velocities are adjustable by sizing of the exhaust port. Filter chamber velocities are adjustable by variance in the gap defining the annular entry between fan and filter column. A drain or sump is concentrically arranged allowing flow or drop from the filter and collection means are provided. The materials of the filter media may be varied to accommodate electrostatic removal of selected materials and the construction is well suited to fabrication using resin materials throughout to provide maximum corrosion resistance in the parts. As will be seen the fan is the sole moving element in the described apparatus and speed controls applied to the fan provide an additional control parameter. A gathering hood is used to gather in diffused gases entrained to the impeller or ducting may be used in which instance the separator structure of the present invention can become a mere sleeve in such a ducting arrangement. Spray provisions may be inserted ahead of the impeller where it is desired to vapor diffuse water or other material into the entrained air or gas mixture. The drains provide convenient means in some instances for back flushing or clearing the filter column as may be desired in particular installations.

IN THE DRAWINGS

SPECIFIC DESCRIPTION

Figure 1:
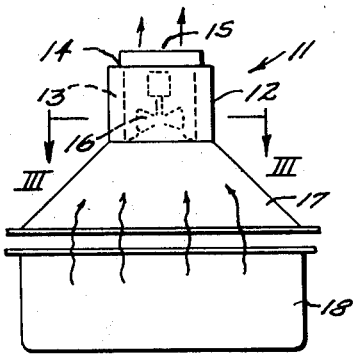
FIG. 1 is a side elevation view of a separator device in accord with the present invention secured to a gathering hood and the gathering hood and separator assembly in vertical position above a contaminator bath or vat.

By specific reference to the drawings the separator 11 is tubular or columnar as seen in FIG. 1. It comprises an outer shell or cylindrical casing 12. Inside the casing 12 is a ring of foraminous filter media 13. The ring 13 as will be seen is slightly inwardly spaced from contact with the internal wall of the casing 12, but is concentric therewith and extends from top to bottom of the separator 11, being supported in a drain sump at the bottom (as seen) and at the top by a cover or flange plate 14 which plate 14 also defines an exit or exhaust port 15. Inboard of the filter column 13 and on the axis of the casing 12 and column 13 is a fan 16. This gathers in polluted vapors or gases in an axial direction and distributes this gas-vapor material radially and spirally as will be seen through the filter column 13 and thence to exhaust as indicated by the arrows at the top of the FIG. 1. A gathering hood 17 is used ahead of the fan 16 and is shown environmentally positioned in respect to a process vat or tank 18 from which polluted gases or vapors are indicated as arising by the squiggle-tailed arrows.

Figure 2:
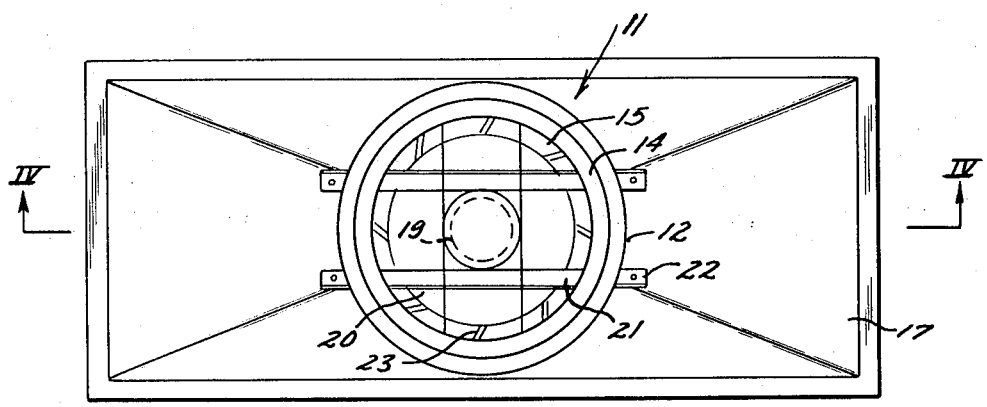
FIG. 2 is a top plan view of the separator shown in FIG. 1 clearly indicating the concentric construction above the gathering hood.
Figure 3:
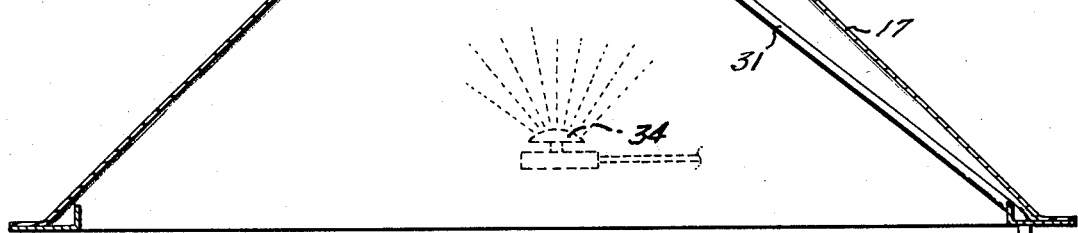
FIG. 3 is a full cross section view taken on the line III—III of FIG. 1 and revealing the concentric arrangement of elements with the outer casing or housing.
Figure 3:
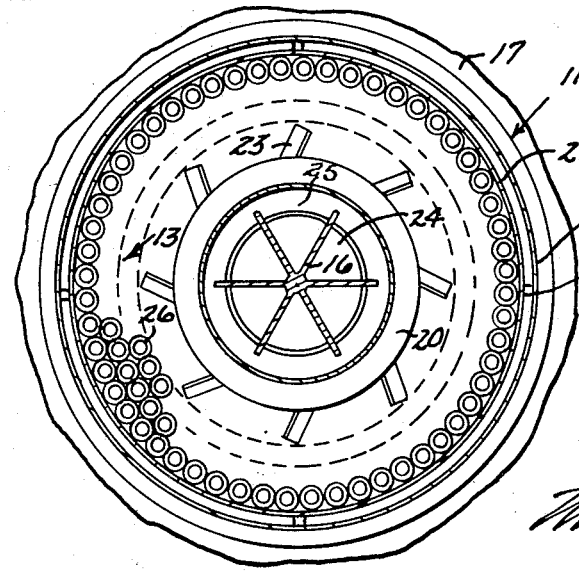

The separator structure 11 is better revealed in its concentric construction in the FIG. 2 since the preferred location for the fan motor 19 on the bell housing 20, suspended by crossed support frame elements 21 are indicated as within the casing 12. The elements 21 extend from the casing 12 to provide extending mounting bracket elements allowing the separator 11 to be suspended as desired. The flange plate 14 is seen to define the exit or exhaust port 15 and the flow directors 23 are partially visible. The fan 16 is seen in hidden edge line in the bell housing 20 and above the entry orifice 24. FIG. 3 further illuminates the inner construction of the separator 11 since it is a section taken on the line III—III of FIG. 1. The fan 16 is located and is rotatable on the axis through the tubular outer casing 12. This is directly over the coaxially mounted entry opening 24 in the floor plate 25. The bell housing 20 which encloses the fan or impeller 16 is shown suspended above the floor plate 25 by the flow directors 23 which extend from the bell housing 20 in a tangential manner so as to assure a spiralling flow of fan entrained material to the filter column 12 comprising plural rows of foraminous filter elements 26, each of said elements being perforate and tubular, their respective axes all parallel to the major axis of the separator 11, and hence concentric about the bell housing 20 and inside the casing 12. The outer ring of filter elements 26 is spaced apart from direct contact with the internal wall of casing 12 as by spacers 27 and spacer rings 28. In this manner, as will be seen, material flowing from the fan 16 is spiralled through the filter column 13 providing an exposure to the media of the filter for a prolonged period of time under a substantial pressure drop condition wehreby the effectiveness of the filter and separator structure is maximized. The probability of particle impingement is substantially upgraded and where the filter media is a resin the electrostatic removal characteristics are materially enhanced.

Figure 5:
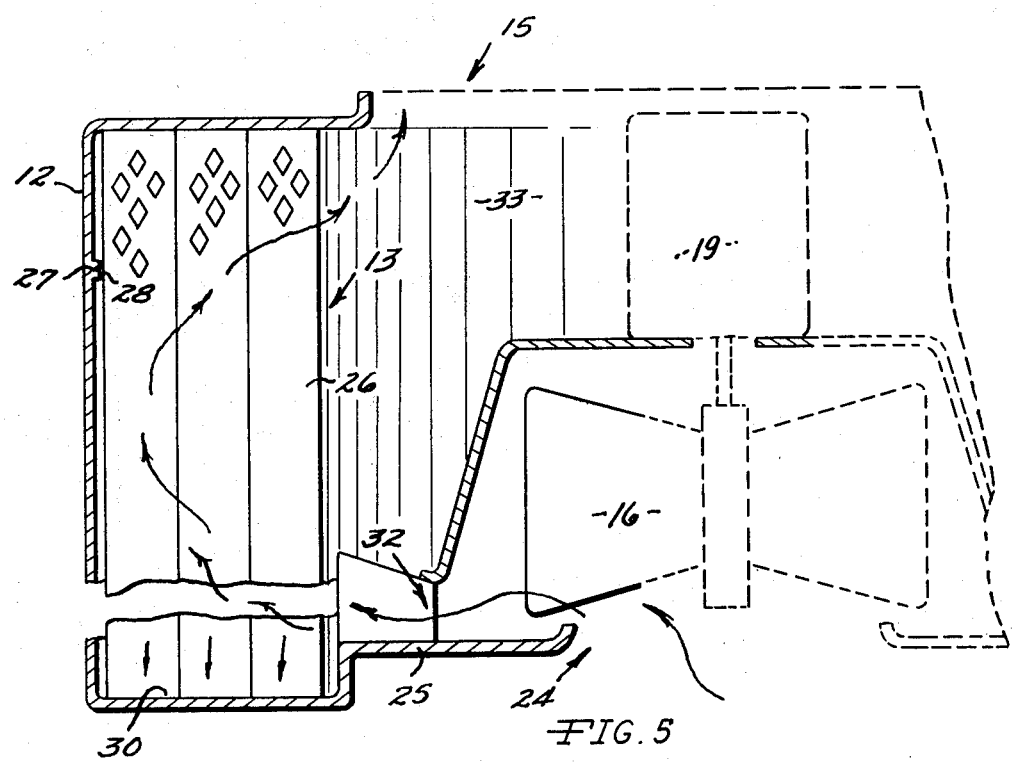
FIG. 5 is a somewhat enlarged partial elevation view as in the FIG. 4 but better designating delivery of air or gases and particles to the filter column and drain of the column to the sump.
Figure 4:
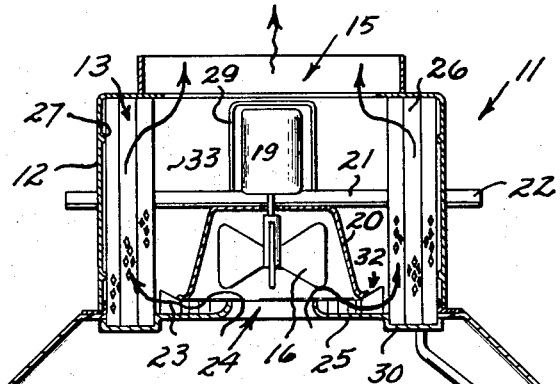
FIG. 4 is a side elevation full section view taken on the line IV—IV of the FIG. 2 and clearly interrelating casing, filter column, bell housing, fan, fan drive and annular porting with flow directors, entry and exhaust openings and drain hood and spray means.

FIG. 4 gives a clearer profile view of the present separator structure 11 and the entry orifice 24 is best understood as defined by the floor plate 25 which substantially closes the entry end of the separator 11. The plate 25 is accordingly round and closes against one edge of the tubular casing 12 and is embossed to provide a peripheral sump or drain 30 which provides a seat or base for the foraminous tubular filter column 13. Materials, for example oil, can then drain down the filter elements of column 12 into the peripheral sump 30 and are returned through drain line 31 for reuse or reclamation. In operation, the fan entrained material flows into the bell housing 20 through the entry orifice 24 to the eye of the impeller or fan 16. Aided by the flow directors 23 and providing an annular opening 32 defined between the bell housing 20 and floor plate 25, the polluted vapors and gases are spiralled out of the bell housing 20 and outwardly and upwardly through the filter ring 23, thence into the central chamber 33 and to exhaust through the exit port 15. The motor housing or motor encasement 29 separates the motor 19 from the environment of the annular chamber 33. Aided by the spacing from the casing 12 flow incurs maximum exposure to filter surface while experiencing a radical pressure drop. The materials to be removed, such as oil vapor, clinging to the filter media gravity flow to the sump 30 and are continuously removed through the drain line 31. Where priming or saturation of gases or vapors are desirable a spray or vaporizing and nebulizing nozzle 34 may be inserted ahead of the entry orifice 24 as indicated in FIG. 4 and as well appreciated in the art the filter media can be flushed or back washed where contamination of the filter media occurs. Where necessary, solvents or wash materials can be trickled or sprayed down the media column 13 for drain through the sump 30 and drain lines 31. Such draining is best appreciated by the flow arrows in FIG. 5.

Figure 6:
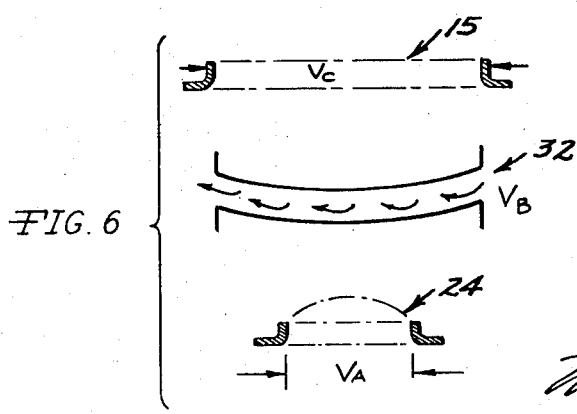
FIG. 6 is a schematic composite view of orifice controls $Va$ established at entry $Vb$ established by annular porting and $Vc$ established by the exhaust port.

In FIG. 6 the major control parameters in the structure 11 are best appreciated and from this FIG. 6 the application range of the basic structure is appreciated as substantially extended. Hence, three variables are provided, the entry port size 24 determines fan entry velocity $Va$. The annular opening 32 determines velocity $Vb$ in conjunction with fan characteristics and the exit opening or port 15 determines the exhaust velocity $Vc$. The foraminous filter 13, dependent upon the selection of materials provides another electrostatic variable, keyed in selection to the characteristics of the material to be removed, and the design for expanding quickly to a volume represented by the chamber 33 in combination with exit port 15 results in a maximization of pressure drop in any particular size of unit. As previously indicated the time exposure of particles to the filter media is vastly increased by virtue of the spirally upward flow of materials resulting from the design of the structure.

The construction of the separator 11 is for use of resin material throughout with the exception of support members 21 which are preferably coated and the shaft 34 and motor 19, the latter being isolated from contact with the flowing gases and/or vapor and their pollutants. The best position for use of the presently described device is the vertical position as described. However, under certain circumstances the structure has been operated successfully in the horizontal position using drains through the casing 12.

In the electrostatic removal the material forming the foraminous filter grid column is diffierentially selected from other material in flow contact relation with contaminant laden gases and vapors so that the electrostatic properties of the grid material match attractively with the induced or inherent electrostatic properties in selected of the materials sought to be removed.

In oil vapor stripping operations the casing, impeller, fan, deflectors, and plates are made from sheet polyvinyl chloride welded and fabricated in normal sheet metal techniques but with resin welds. The ubular foaminous filter elements are preferably polypropylene for oil vapors in the form of interwoven-like strands and sold under the trademark "Vexar" piping of E. I. du Pont de Nemours & Co. The interweaving of the strands is in crossed spirals, the strands approximately 3/16 inch in diameter and the diamond shaped resulting voids approximately 1/8 inch by 1/8 inch. The effect of such selection of differential in resin as between casing fan in polyvinyl chloride and media of polypropylene is a resultant excellent electrostatic precipitation. Other selections of differential resins are found desirable for removal of other materials. The described construction is otherwise constant. While the motor as shown is encased in the separator 11 and positioned on the bell housing 20 thereof, in at least one installation a shaft was extended axially through the separator 11 and the fan or impeller 16 was driven by belting which rotated the fan shaft. Other drive arrangements will be obvious to those skilled in the art. As will be appreciated by varying the relative opening changes in Va, Vb and Vc variations in treatment conditions are available and the parameter of optimum use in variant environments is unusually extended.

Having thus described my invention and in particular a preferred and operative embodiment thereof others skilled in the art will perceive changes, modifications and improvements therein and such changes, modifications and improvements are intended to be included in the spirit of the present invention limited only by the scope of the hereinafter appended claims.

I claim:

1. A contaminant removing structure applied to contaminant laden gases or vapors comprising:

a gathering hood having a converging connecting portion;

a floor plate against which said connecting portion of said gathering hood closes and having a central entry orifice therethrough;

a bell housing coaxially positioned in relation to said entry orifice, the lower periphery of said bell housing in spaced axial relation to said floor plate thereby defining an annular peripheral gap adjacent the lower periphery of said bell housing;

an impeller in said bell housing, the axis of said impeller located on the axis of said entry orifice whereby gases and vapors are drawn through said entry orifice and expelled through said annular peripheral gap;

a motor driveably connected to said impeller and positioned coaxially with said impeller and on said bell housing;

a motor encasement separating said motor from direct contact with gases and vapors;

fixed transitional flow directors tangentially related to said impeller and radially disposed about said entry orifice in spaced apart relation and transitionally directing the flow of contaminated gases and vapors through said peripheral gap in a spiralling manner;

an annular drain sump outboard of said flow directors and formed in said floor plate and including drain means;

a foraminous open-work resin filter grid positioned at one end in said sump and defining a cylindrical filter column through which said vapors and gases are spirally moved;

an outer cylindrical encasement coaxially positioned around said filter grid and bell housing and having a flanged exit opening at one end and closing against said floor plate at the other end and defining the outer limits of a cylindrical chamber internally limited by said motor encasement and bell housing;

spacer rings supporting said filter column in spaced apart relation from said outer encasement; and transverse support elements through said outer cylindrical encasement and extending therefrom in partial centering support of said motor and motor encasement and said bell housing and providing external mounting means.

2. A structure in accord with claim 1 in which said hood, said impeller, said outer encasement, said bell housing, said motor encasement and said flow directors provide a resin contact surface to gases and vapors having different electrostatic properties from the resin forming said foraminous filter grid.

3. A tri-velocity contaminant removing structure for gases and vapor comprising:

a corrosion resistant resin tubular flow confining housing defining an entry velocity determining opening in one end and an exit velocity determining orifice in the other end;

a resin bell housing coaxially positioned in said flow confining housing and axially spaced from closure against said entry opening thus forming an annular gap adjacent said opening;

resin flow directors radially concentric around said entry opening and in said gap and peripherally supporting said bell housing;

a coaxially driven resin impeller in said bell housing and axially located with respect to said bell housing whereby gases and vapors are moved through said entry orifice adjacent the center of said impeller and are radially and tangentially flung outwardly toward and between said flow directors;

a foraminous openwork resin cylinder filter column comprising individual tubes in spaced concentric relation to said housing and extending the length of said housing, the resin in said filter column being a different resin than the resin of said housing, said impeller, said bell housing, and said flow directors;

an annular sump peripherally adjacent said gap coaxially positioned at one end of said housing in which one end of said filter column sets and including a drain extending therefrom;

a chamber defined peripherally by said filter column and internally by said bell housing and coaxially within said housing and open at said exit orifice;

support elements secured in support of said housing, said bell housing and said driven impeller and whereby said contaminant removing structure may be mounted for use; and spray means adjacent said entry opening whereby a liquid spray is selectively entrained with gases and vapors entering said structure.

(References on following page)

References Cited

UNITED STATES PATENTS

| | | | |
|---|---|---|---|
| 1,784,627 | 12/1930 | Hamill | 55—452 |
| 1,805,830 | 5/1931 | Mason | 55—400X |
| 1,958,145 | 5/1934 | Jones | 55—400X |
| 2,047,025 | 7/1936 | Gilbert | 261—91 |
| 2,114,682 | 4/1938 | Gumaer | 55—103X |
| 2,114,780 | 4/1938 | Juelson | 55—258X |
| 2,232,913 | 2/1941 | Heuberger | 55—278 |
| 2,375,203 | 5/1945 | Appeldoorn | 55—406 |
| 2,992,700 | 7/1961 | Silverman et al. | 55—103X |
| 2,999,563 | 9/1961 | Wehn et al. | 55—435X |
| 3,107,857 | 10/1963 | Flury | 239—216 |
| 2,874,797 | 2/1959 | Flury | 261—91X |
| 3,251,176 | 5/1966 | Gleason | 55—457X |
| 3,321,891 | 5/1967 | Coanda | 55—103 |
| 3,329,130 | 7/1967 | Cochran | 55—457X |
| 3,343,341 | 9/1967 | Wiemer | 261—116X |

DENNIS E. TALBERT, JR., Primary Examiner

U.S. Cl. X.R.

55—122, 127, 237, 257, 337, 394, 410, 418, 456, 471, 472, 473, 522, 529; 98—115; 261—79, 116